July 15, 1947. W. LANG 2,424,100
RELAY TYPE ADDING AND RESULT CHECKING MACHINE
Filed Nov. 10, 1944 6 Sheets-Sheet 5

INVENTOR
WILLIAM LANG
BY
ATTORNEY

Patented July 15, 1947

2,424,100

UNITED STATES PATENT OFFICE 2,424,100

RELAY TYPE ADDING AND RESULT CHECKING MACHINE

William Lang, New York, N. Y., assignor to International Business Machines Corporation, New York, N. Y., a corporation of New York Application November 10, 1944, Serial No. 562,756

5 Claims. (Cl. 235—61.7)

1

This invention relates to record controlled calculating machines of the so-called relay adding type.

The principal object of the invention is to construct a relay adding apparatus in which checking or verification of the result is made after each and every entry into the adding apparatus by performing a different type of calculation with the same value entered and employing different devices.

Specifically, the machine enters an amount from a record card and this is added to the amount already in the machine to obtain a new total. This total is obtained by the joint action of what may be termed two sets of relays A and B, upon which the two amounts are set respectively and their total is entered in a third set of relays C. For checking purposes, the previous total in relays B is transferred and stored in a set of relays D, while the new total is reentered in relays B and the amount to be added is entered complementarily in relays A. The sum of the settings of relays A and B, which should equal the previous total, is then entered in a set of relays E and a comparison of the settings of relays D and E is made.

A more specific object of the machine resides in the provision of sequencing control devices for effecting the foregoing sequence of operations.

A further object is to provide novel devices for causing interruption in machine operation and indication of the source of error upon detection of such error.

A further object is to provide a rapid relay adding mechanism wherein a series of electrical impulses, no greater than five, is required for each amount added.

Other objects of the invention will be pointed out in the following description and claims and illustrated in the accompanying drawings, which disclose, by way of example, the principle of the invention and the best mode, which has been contemplated, of applying that principle.

2

Figure 1A:
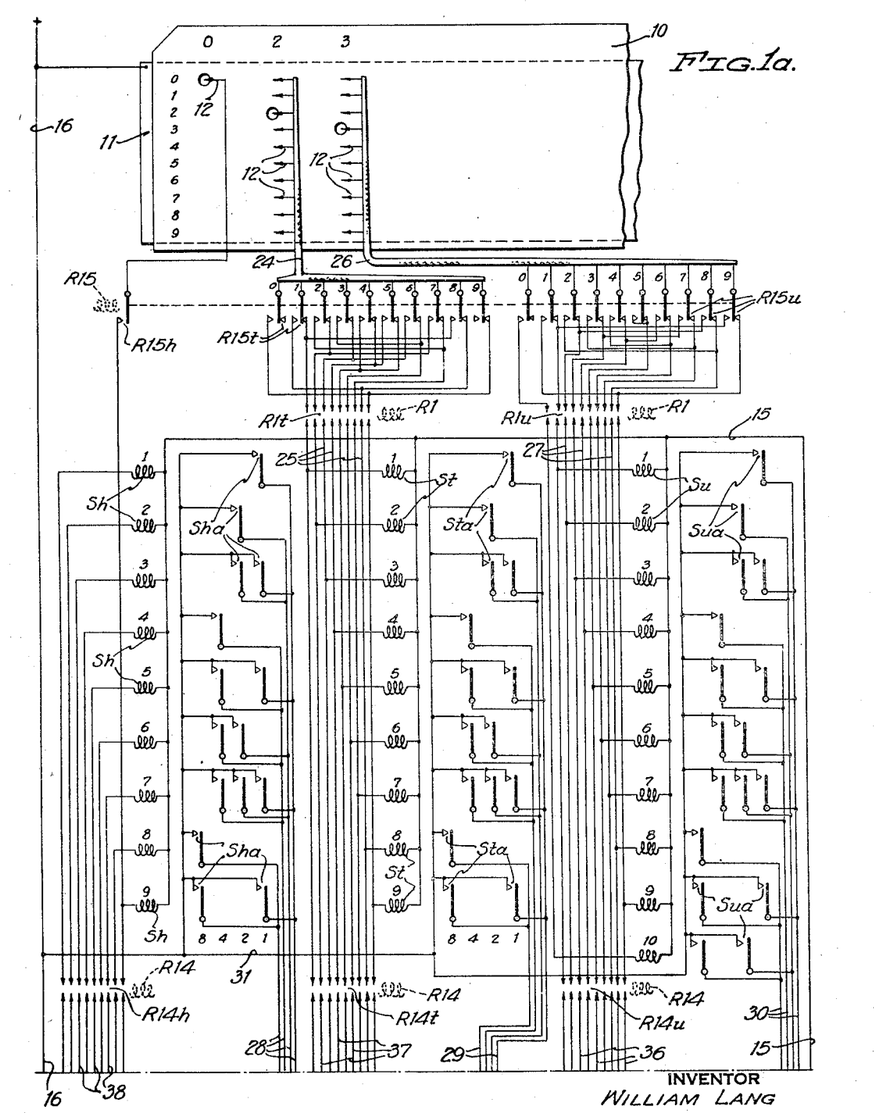
Figs. 1a, 1b, 1c, 1d and 1e when arranged in the order 1a
1b, 1c, 1d, 1e constitute a wiring diagram of the electric circuits of the apparatus.

In the drawings, the record card sensing devices are shown in a diagrammatic manner where in Fig. 1a 10 represents a record card of the well known type provided with rows and columns of index point positions in which digits are recorded by perforating selected positions. Thus, the card in Fig. 1a is perforated in accordance with the number 023. The machine is shown as having a capacity for adding two-place numbers and it is necessary to perforate zeros to the left of the highest significant digit.

The record card 10 is placed in sensing position between a common conductive plate 11 and sets of brush sensing elements 12. As usual, the presence of a digit representing perforation in any card column will allow the related brush 12 to make electrical contact with conductive plate 11.

Before tracing circuits through the card perforations, the sequencing commutator will be described together with the time chart, Fig. 3. Referring to Fig. 1e, after a card 10 has been placed in sensing position, start contacts 13 are closed to energize clutch magnet 14 by connecting it to opposite sides of current lines 15 and 16 through a pair of normally closed relay magnet contacts R17a.

A continuously running motor M drives a clutch disk 17 and, when magnet 14 is energized, it rocks its latching armature 18 to release spring pressed dog 19 for engagement with constantly running clutch disk 17. As a result, disk 20 upon which dog 19 is pivoted will rotate for one revolution and similarly turn commutator 21 with which a row of brushes 22 coact. In the timing diagram, Fig. 3 the sequence of operations occurring during a full rotation of commutator 21 is represented with brushes 22 indicated in their relative starting positions.

Each brush is wired to a relay magnet or magnets identified as $R^1$, $R^2$, $R^3$, etc. and, as commutator 21 revolves, circuits are completed from negative line 15 (Fig. 1e) to common brush 23, brushes 22, their related relay magnets to positive line 16.

Figure 3:
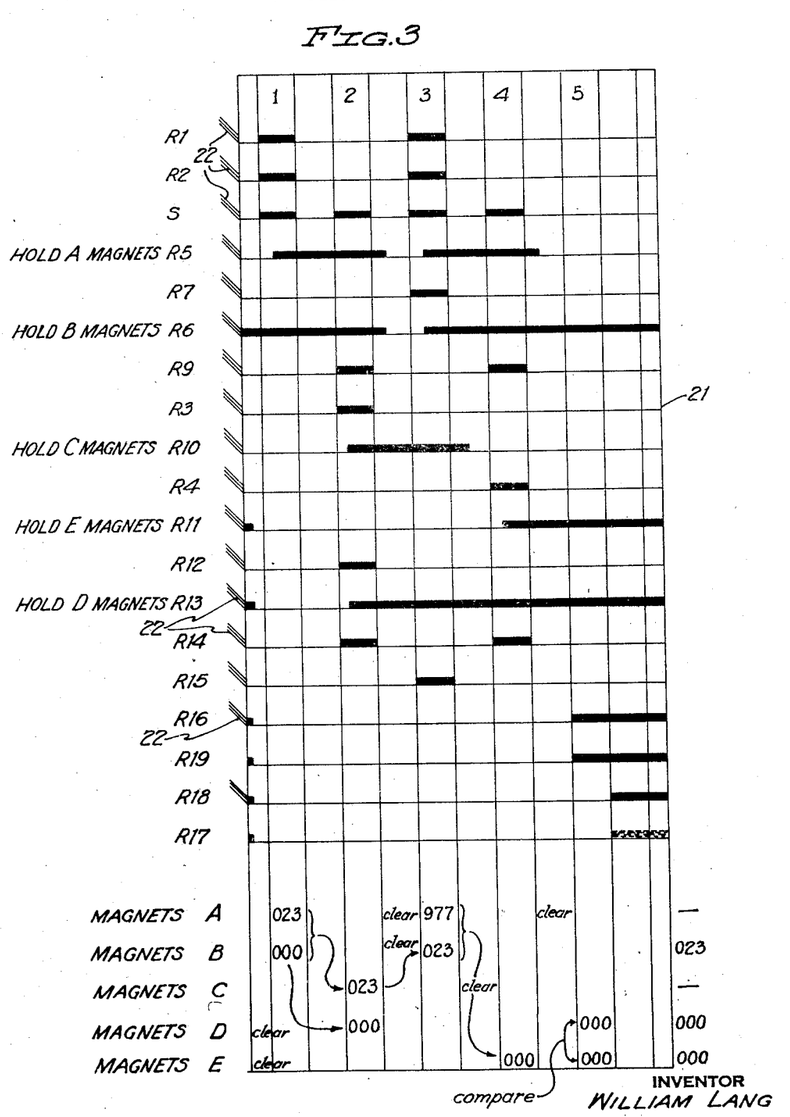
Fig. 3 is a timing and sequence diagram of the time of energization of the several relay magnets.

As seen from Fig. 3, relays R6, R11, R13, R16 and R18 are initially energized and that upon commencement of rotation of commutator 21 all but relay R6 will become deenergized. Relay R6 is initially in energized condition to hold circuits set up during a previous operation. At the present time its energization is of no effect.

*Enter amount 023.*—With card 10 in sensing position and commutator 21 rotating, it will be seen from Fig. 3 that relays R1 and R2 become energized and shortly thereafter relay R5 becomes energized. Referring to Fig. 1a, relays R1 close sets of contacts, R1u and R1t which will complete circuits through the perforations in the card 10 to energize selected relays of a tens group St and a units group Su. For the specific example, a circuit is traceable from positive line 16, common plate 11, perforation in the 2 position, 2 brush 12 of a group in cable 24, 2 contacts R15t, 2 contacts R1t (now closed), 2 wire of a group 25, the 2 magnet St to negative line 15.

Concurrently, there is a circuit from line 16, common plate 11, perforation in the 3 position, 3 brush 12 of a group in cable 26, 3 contacts R15u, 3 contacts R1u (now closed), 3 wire of a group 27, 3 magnet Su, to line 15.

There is a third set of magnets Sh similar to magnets St and Su, which however do not receive an entry at this time inasmuch as the capacity shown is only for entry of two-place numbers from the card.

The contacts of magnets generally designated Sha, Sta and Sua connect positive line 16 to combinations of four wires 28, 29 and 30 in accordance with the well known binary code. Thus, in the tens order, for example, the 1 magnet St connects line 16 to the 1 wire 29, the 2 magnet St connects line 16 to the 2 wire 29, the 3 magnet St connects line 16 to the 1 and 2 wires 29, the 4 magnet St connects line 16 to the 4 wire 29, the 5 magnet St connects line 16 to the 1 and 4 wires 29, the 6 magnet St connects line 16 to the 2 and 4 wires 29, the 7 magnet St connects line 16 to the 1, 2 and 4 wires 29, the 8 magnet St connects line 16 to the 8 wire 29, and the 9 magnet St connects line 16 to the 1 and 8 wires 29.

For the amount 023, no circuit is completed in the hundreds order. For the tens order a circuit is traceable from line 16, wire 31, contacts Sta of the 2 magnet St, 2 wire 29 (Fig. 1c), contacts R2t (now closed), 2 wire 32 to magnet A2 and wire 33 to line 15. A parallel circuit is also traceable from line 16, wire 31 (Fig. 1a), the contacts Sua of the 3 magnets Su, the 1 and 2 wires 30 (Figs. 1c and 1d), contacts R2u (now closed), 1 and 2 wires 34 to magnets A1 to A2 and wire 35 to line 15.

The amount 023 is thus sensed, converted into binary code and entered on the A magnets A2 for the tens digit and A1 and A2 for the units digit. These magnets close contacts suffixed a to provide holding circuits through relay magnet contacts R5u, R5t, when magnet R5 is energized as indicated in Fig. 3. A representative circuit is traceable in Fig. 1d from line 16, contacts R5u, A1a, magnet A1, wire 35 to line 15. This circuit holds the A magnets energized for the period indicated opposite R5 in Fig. 3.

*Add amounts in A and B magnets.*—The next step or portion of the cycle designated as 2 in Fig. 3 serves to add the amounts set in the A and B magnets and enter the result in the set of C magnets. Since there is no setting in the B magnets, the amount 023 will be transferred to the C set, and this is effected by the energization of the magnets R9, R3, R12, R14, R10 and R13 during this step of operation.

Figure 1B:
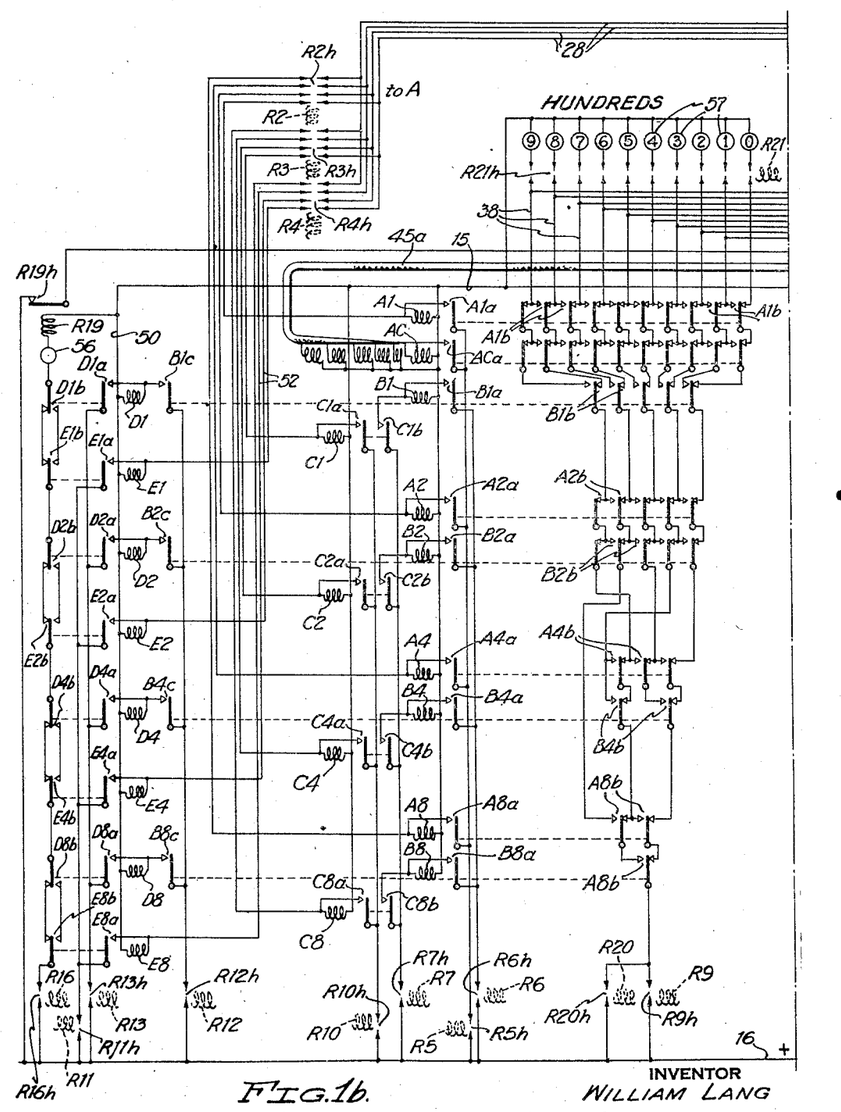
Figure 1C:
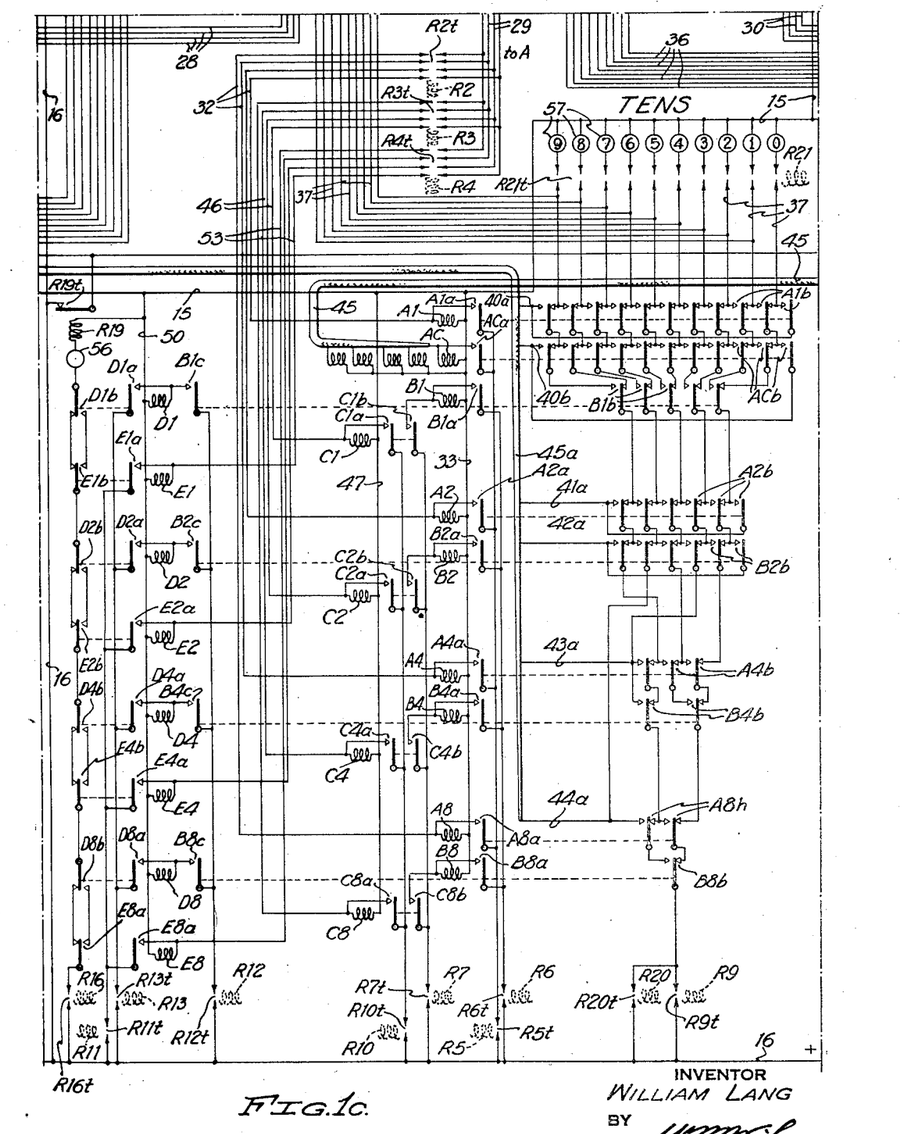
Figure 1D:
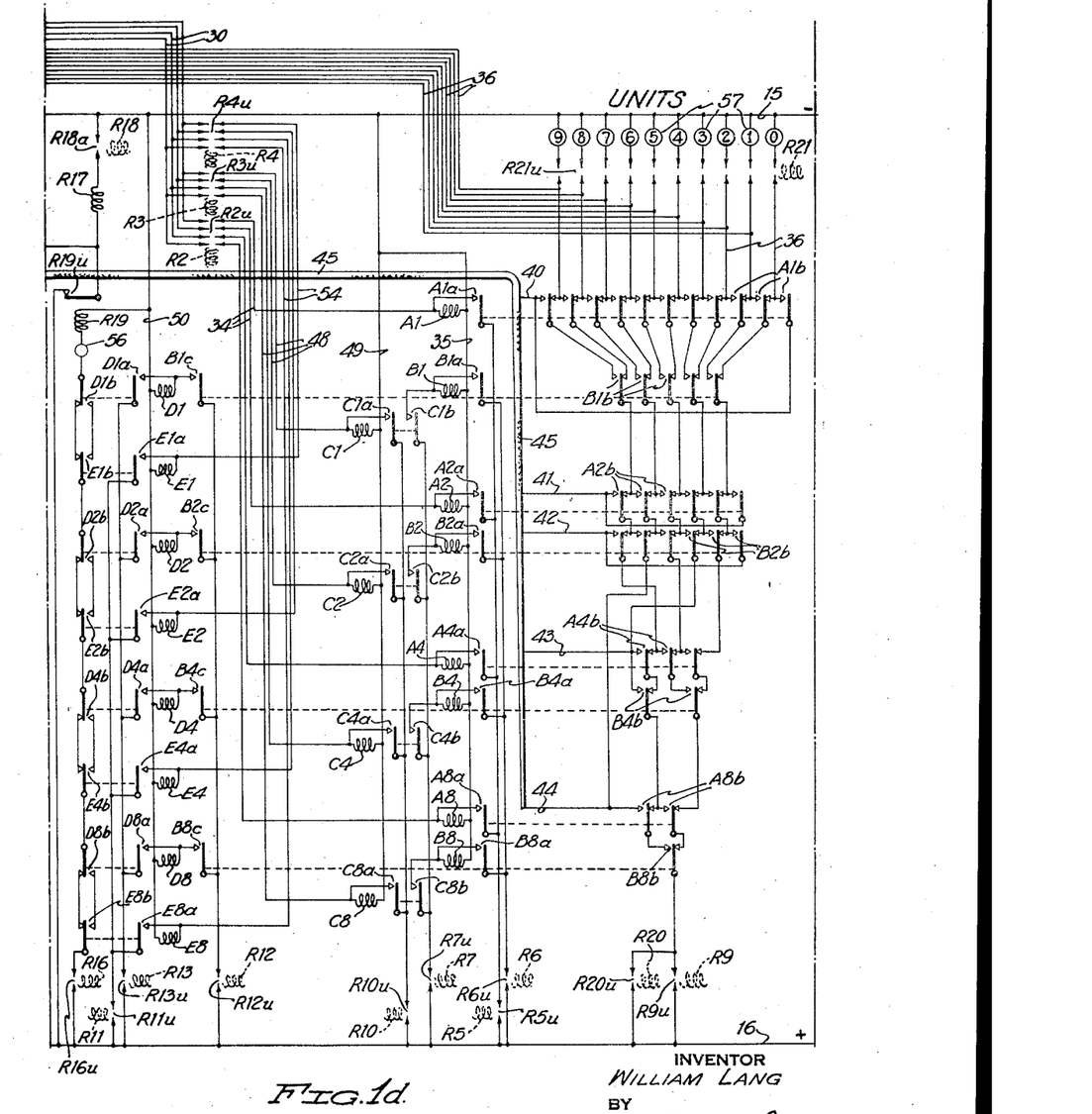
Figure 1E:
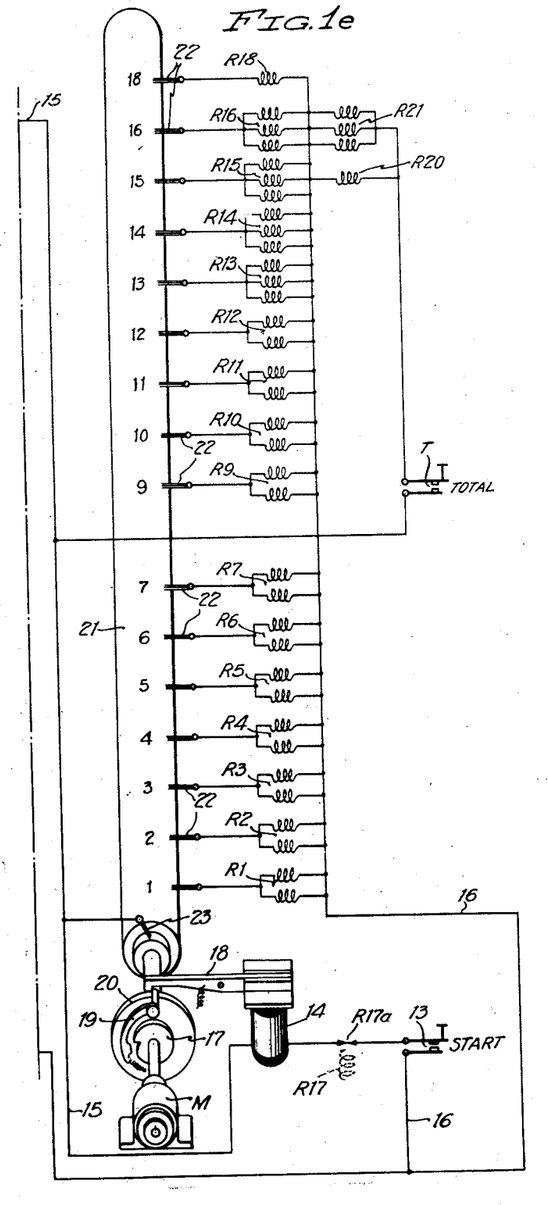

In Figs. 1b, 1c and 1d the A and B magnets control sets of contacts suffixed b electrically interconnected to form an adding chain and which connects line 16 to the wire of a group designated 36 for the units, 37 for the tens, and 38 for the hundreds order, corresponding to the units digit of the sum of the digits set on the A and B magnets in each order.

Specifically, for the example of an entry of 3 on the A magnets of the units order (Fig. 1d) (i. e. magnets A1 and A2 energized), upon closure of contacts R9u a circuit is traceable from line 16, contacts R9u, contacts B8b, right hand contacts A8b, right hand contacts B4b, right hand contacts A4b, contacts B2b second from the right, contacts A2b second from the right (shifted), contacts B1b second from the right, contacts A1b fourth from the right (shifted), 3 wire 36 (Figs. 1c and 1a), contacts R14u, 3 wire 27 and 3 magnet Su to negative line 15. In this manner upon energization of magnets R9 and R14 the units digit of the sum of the digits in the units order is entered on the Su magnets.

Concurrently, the energization of magnets R9 and R14 will energize the St magnet corresponding to the units digit of the sum of the A and B settings in the tens order. This circuit is traceable from line 16 (Fig. 1c), contacts R9t, contacts B8b, right hand contacts A8h, right hand contacts B4b, right hand contacts A4b, contacts B2b second from the right, contacts A2b second from the right (shifted), contacts B1b second from the right, contacts ACb fourth from the right, contacts A1b fourth from the right, 2 wire 37 (Fig. 1a), contacts R14t, 2 wire 25, 2 magnet St to line 15. Magnets St and Su are thus set to represent 23.

Inspection of the adding chain in Fig. 1d, for example, will show that for all combinations of A and B digits the circuit will extend from line 16 to the wire 36 representing the units digit of the sum of the digits set up and the following table will assist in tracing the several combinations. In a column headed "Carry wire" is indicated a wire through which a carry circuit is completed where the sum is greater than 9. A specific circuit showing this will be traced following the table.

| A Digit | A Magnets | B Digit | B Magnets | Wire 36 | Carry Wire |
|---|---|---|---|---|---|
| 1 | 1 | 0 |  | 1 |  |
| 1 | 1 | 1 | 1 | 2 |  |
| 1 | 1 | 2 | 2 | 3 |  |
| 1 | 1 | 3 | 1,2 | 4 |  |
| 1 | 1 | 4 | 4 | 5 |  |
| 1 | 1 | 5 | 1,4 | 6 |  |
| 1 | 1 | 6 | 2,4 | 7 |  |
| 1 | 1 | 7 | 1,2,4 | 8 |  |
| 1 | 1 | 8 | 8 | 9 |  |
| 1 | 1 | 9 | 1,8 | 0 | 40 |
| 2 | 2 | 0 |  | 2 |  |
| 2 | 2 | 1 | 1 | 3 |  |
| 2 | 2 | 2 | 2 | 4 |  |
| 2 | 2 | 3 | 1,2 | 5 |  |
| 2 | 2 | 4 | 4 | 6 |  |
| 2 | 2 | 5 | 1,4 | 7 |  |
| 2 | 2 | 6 | 2,4 | 8 |  |
| 2 | 2 | 7 | 1,2,4 | 9 |  |
| 2 | 2 | 8 | 8 | 0 | 41 |
| 2 | 2 | 9 | 1,8 | 1 | 41 |
| 3 | 1,2 | 0 |  | 3 |  |
| 3 | 1,2 | 1 | 1 | 4 |  |
| 3 | 1,2 | 2 | 2 | 5 |  |
| 3 | 1,2 | 3 | 1,2 | 6 |  |
| 3 | 1,2 | 4 | 4 | 7 |  |
| 3 | 1,2 | 5 | 1,4 | 8 |  |
| 3 | 1,2 | 6 | 2,4 | 9 |  |
| 3 | 1,2 | 7 | 1,2,4 | 0 | 40 |
| 3 | 1,2 | 8 | 8 | 1 | 41 |
| 3 | 1,2 | 9 | 1,8 | 2 | 41 |
| 4 | 4 | 0 |  | 4 |  |
| 4 | 4 | 1 | 1 | 5 |  |
| 4 | 4 | 2 | 2 | 6 |  |
| 4 | 4 | 3 | 1,2 | 7 |  |
| 4 | 4 | 4 | 4 | 8 |  |
| 4 | 4 | 5 | 1,4 | 9 |  |
| 4 | 4 | 6 | 2,4 | 0 | 42 |
| 4 | 4 | 7 | 1,2,4 | 1 | 42 |
| 4 | 4 | 8 | 8 | 2 | 43 |
| 4 | 4 | 9 | 1,8 | 3 | 43 |
| 5 | 1,4 | 0 |  | 5 |  |
| 5 | 1,4 | 1 | 1 | 6 |  |
| 5 | 1,4 | 2 | 2 | 7 |  |
| 5 | 1,4 | 3 | 1,2 | 8 |  |

| A Digit | A Magnets | B Digit | B Magnets | Wire 36 | Carry Wire |
|---|---|---|---|---|---|
| 5 | 1,4 | 4 | 4 | 9 | ----- |
| 5 | 1,4 | 5 | 1,4 | 0 | 40 |
| 5 | 1,4 | 6 | 2,4 | 1 | 42 |
| 5 | 1,4 | 7 | 1,2,4 | 2 | 42 |
| 5 | 1,4 | 8 | 8 | 3 | 43 |
| 5 | 1,4 | 9 | 1,8 | 4 | 43 |
| 6 | 2,4 | 0 | ----- | 6 | ----- |
| 6 | 2,4 | 1 | 1 | 7 | ----- |
| 6 | 2,4 | 2 | 2 | 8 | ----- |
| 6 | 2,4 | 3 | 1,2 | 9 | ----- |
| 6 | 2,4 | 4 | 4 | 0 | 41 |
| 6 | 2,4 | 5 | 1,4 | 1 | 41 |
| 6 | 2,4 | 6 | 2,4 | 2 | 42 |
| 6 | 2,4 | 7 | 1,2,4 | 3 | 42 |
| 6 | 2,4 | 8 | 8 | 4 | 43 |
| 6 | 2,4 | 9 | 1,8 | 5 | 43 |
| 7 | 1,2,4 | 0 | ----- | 7 | ----- |
| 7 | 1,2,4 | 1 | 1 | 8 | ----- |
| 7 | 1,2,4 | 2 | 2 | 9 | ----- |
| 7 | 1,2,4 | 3 | 1,2 | 0 | 40 |
| 7 | 1,2,4 | 4 | 4 | 1 | 41 |
| 7 | 1,2,4 | 5 | 1,4 | 2 | 41 |
| 7 | 1,2,4 | 6 | 2,4 | 3 | 42 |
| 7 | 1,2,4 | 7 | 1,2,4 | 4 | 42 |
| 7 | 1,2,4 | 8 | 8 | 5 | 43 |
| 7 | 1,2,4 | 9 | 1,8 | 6 | 43 |
| 8 | 8 | 0 | ----- | 8 | ----- |
| 8 | 8 | 1 | 1 | 9 | ----- |
| 8 | 8 | 2 | 2 | 0 | 42 |
| 8 | 8 | 3 | 1,2 | 1 | 42 |
| 8 | 8 | 4 | 4 | 2 | 43 |
| 8 | 8 | 5 | 1,4 | 3 | 43 |
| 8 | 8 | 6 | 2,4 | 4 | 43 |
| 8 | 8 | 7 | 1,2,4 | 5 | 43 |
| 8 | 8 | 8 | 8 | 6 | 44 |
| 8 | 8 | 9 | 1,8 | 7 | 44 |
| 9 | 1,8 | 0 | ----- | 9 | ----- |
| 9 | 1,8 | 1 | 1 | 0 | 40 |
| 9 | 1,8 | 2 | 2 | 1 | 41 |
| 9 | 1,8 | 3 | 1,2 | 2 | 41 |
| 9 | 1,8 | 4 | 4 | 3 | 42 |
| 9 | 1,8 | 5 | 1,4 | 4 | 42 |
| 9 | 1,8 | 6 | 2,4 | 5 | 42 |
| 9 | 1,8 | 7 | 1,2,4 | 6 | 42 |
| 9 | 1,8 | 8 | 8 | 7 | 44 |
| 9 | 1,8 | 9 | 1,8 | 8 | 44 |
| 0 | ----- | 0 | ----- | 0 | ----- |
| 0 | ----- | 1 | 1 | 1 | ----- |
| 0 | ----- | 2 | 2 | 2 | ----- |
| 0 | ----- | 3 | 1,2 | 3 | ----- |
| 0 | ----- | 4 | 4 | 4 | ----- |
| 0 | ----- | 5 | 1,4 | 5 | ----- |
| 0 | ----- | 6 | 2,4 | 6 | ----- |
| 0 | ----- | 7 | 1,2,4 | 7 | ----- |
| 0 | ----- | 8 | 8 | 8 | ----- |
| 0 | ----- | 9 | 1,8 | 9 | ----- |

Assume, for example, a setting in the units order of 9 on the A magnets and a setting of 2 on the B magnets. The carry circuit would then be traceable from line 16, contacts R9u, B8b, right hand contacts A8b (shifted), left hand contacts B4b, left hand contacts A4b, left hand contacts B2b (shifted), wire 42, cable 45 (Fig. 1c) to one coil of a multiple coil magnet AC in the tens order, wire 33 to line 15.

The adding chain in the tens order is just the same as for the units orders, except that the contacts ACb are interposed to add a unit to the sum in the tens orders when there is a carry from the units order. In the tens adding chain there are in turn carry circuits branching through wires 40a, 41a, 42a, 43a and 44a, corresponding to wires 40 to 44 for the units order, and these together with an added wire 40b run through cable 45a to the coils of magnet AC in the hundreds order to shift contacts ACb in that order, when there is a carry from the tens order. In the hundreds or highest order, no carry wires are needed.

As explained, the sum of the A and B settings is now entered in the St and Su magnets and with magnet R3 also energized at this time (Fig. 3) circuits extend from line 16 (Fig. 1a), wire 31, contacts Sta, wires 29 (Fig. 1c), contacts R3t (now closed), wires 46 to the C magnets in the tens order corresponding to the digit set on the St magnets, and wire 47 to line 15.

Concurrently, circuits extend from line 16 (Fig. 1a), wire 31, contacts Sua, wires 30 (Figs. 1c and 1d), contacts R3u (now closed), wires 48 to the C magnets in the units order corresponding to the digit set on the Su magnets and wire 49 to line 15. For the example chosen, the C magnets are now energized to represent 23. They close their contacts C1a, C2a, C4a and C8a as the case may be to provide holding circuits completed when magnet R10 is energized traceable in the units order from line 16 (Fig. 1d), contacts R10u, contacts C8a to C1a, magnets C8 to C1, wire 49 to line 15. The C magnets will thus be held for the period indicated in Fig. 3 after the holding circuits for the A and B magnets are broken by de-energization of magnets R5 and R6.

Magnets B1 to B8 in each order close related contacts B1c to B8c and, when magnet R12 is energized along with magnets R3, R9 and R14, circuits are completed to transfer the setting of the B magnets to the set of D magnets D1 to D8. Such circuits are traceable in the units order from line 16, contacts R12u, B1c to B8c, magnets D1 to D8 and wire 50 to line 15. The D magnets close contacts suffixed a to provide holding circuits through contacts R13h, R13t and R13u. For the present example, there is no setting on the B magnets so this is an idle operation.

At the bottom of Fig. 3 is indicated the operations taking place in the several steps of operation, and it is noted that during the first step the amount 23 was entered into the A magnets and in the second step the sum of A and B is entered into the C magnets, while the B amount is entered into the D magnets. Following the second step or impulse, magnets A and B are cleared leaving the settings in the C and D magnets.

In the next or third step the amount perforated in the card 10 is reentered into the A magnets, this time in the form of a tens complement, and at the same time the new total now in the C magnets is transferred to the B magnets. This is effected by energization of magnets R1, R2, R7 and R15.

Magnet R15 shifts its contacts R15t and R15u (Fig. 1a) to invert the connections between brushes 12 and wires 25 and 27, so that the circuit in the tens order is directed through the wire 25 corresponding to the 9's complement of the digit perforated and in the units order through the wire 27 corresponding to the tens complement. In the hundreds order contacts R15h direct a circuit to the 9 magnet Sh.

For the specific problem of sensing 023, the circuits to the S magnets are as follows. For the units order from line 16, plate 11, 3 hole, 3 brush 12, cable 26, 3 contacts R15u (shifted), 7 contacts R1u, 7 wire 27 and 7 magnet Su to line 15. For the tens order from line 16, plate 11, 2 hole, 2 brush 12, cable 24, 2 contacts R15t (shifted), 7 contacts R1t, 7 wire 25, 7 magnet St to line 15. For the hundreds order from line 16, plate 11, 0 hole, brush 12, contacts R15h and 9 magnet Sh to line 15.

Thus, the S magnets are set to represent the 10's complement of 023 which is 977 and this amount is transferred to the A magnets through the contacts of magnet R2 in the now familiar manner and held through the contacts of magnet R5 as before.

During this third step also the setting of the C magnets to transfer to the B magnets is as follows. Upon closure of contacts R7u, R7t, and R7h due to energization of magnet R7 (Fig. 3), circuits are completed through the three orders which for the units order are traceable from line 16, contacts R7u, contacts C1b to C8b, magnets B1 to B8, and wire 35 to line 15. The B magnets, of which B1 and B2 are energized in the units order and B2 in the tens order for the example chosen, are held through their *a* contacts and magnet contacts R6*u* and R6*t* which close as indicated in Fig. 3. Thus, following step 3 settings are held in the A and B magnets of amounts 977 and 023 respectively. Magnets C are cleared by deenergization of magnet R10.

The fourth step or impulse now occurs wherein magnets R9, R4 and R14 become energized to effect the summation of the amounts set on the A and B magnets and the entry thereof into the magnets of a set generally designated E. For the first entry, if the several magnets and contacts have functioned correctly, this result is 000 so that in effect there is no circuit completion. However, it will be apparent from the foregoing description that upon energization of magnets R9 and R14, circuits will be completed (when there is a significant total) through the three adding chains to set this sum on the S magnets.

The magnet R4 closes contacts R4*u*, R4*t*, and R4*h* (Figs. 1*b*, 1*c* and 1*d*) respectively to direct the circuits from the contacts S*ha*, S*ta* and S*ua* through groups of wires 28, 29 and 30, contacts R4*h*, R4*t* and R4*u*, groups of wires 52, 53 and 54 to magnets E1 to E8 in the several orders and wires 50 to line 15. The E magnets close contacts suffixed *a* to provide holding circuits through contacts R11*h*, R11*t* and R11*u*.

Thus as seen from Fig. 3, after step 4 settings are held on magnets B, D and E wherein, if the magnets and contacts have all functioned correctly, B represents the new total, D represents the old total, and E represents the old total obtained by a separate calculation involving the subtraction of the new amount from the new total.

This procedure serves as a check or verification that the circuit system functioned correctly from the initial entry into the B magnets to the setting of the new total in the B magnets. To show how a misoperation is evidenced, let it be assumed that in the summation a magnet contact in the units order of the adding chain, for example contacts A4*b* in the units order, failed to return from the shifted position due to stickiness or burning or other cause, the effect would be as graphically set forth hereinafter.

| Steps or Impulses | 1 | 2 | 3 | 4 |
|---|---|---|---|---|
| Magnets A | 027 | | 977 | |
| Magnets B | 000 | | 027 | |
| Magnets C | | 027 | | |
| Magnets D | | 000 | | |
| Magnets E | | | | 004 |

This chart, following the diagram at the bottom of Fig. 3, indicates that due to the sticking of contacts A4*b* in the units order, the entry of 023 is erroneously set as 027 and so transferred as 027 to the C magnets. The complemental entry of 977 would be correct so that the sum of 977 and 027 would transfer to magnets E as 004 and be in disagreement with the setting in the D magnets.

Taking a further supposition of a contact A8*b* in the units order sticking there for the same entry of 023, the effect would be as follows:

| Steps or Impulses | 1 | 2 | 3 | 4 |
|---|---|---|---|---|
| Magnets A | 02-11 | | 977 | |
| Magnets B | 000 | | 031 | |
| Magnets C | | 031 | | |
| Magnets D | | 000 | | |
| Magnets E | | | | 008 | resulting in disagreement between the settings of magnets D and E.

Similarly, if for example a contact of the B magnets became "stuck," for example contacts B2*b* in the units order to leave an erroneous entry of 002 at the start, the result would be as follows:

| Steps or Impulses | 1 | 2 | 3 | 4 |
|---|---|---|---|---|
| Magnets A | 023 | | 977 | |
| Magnets B | 002 | | 027 | |
| Magnets C | | 025 | | |
| Magnets D | | 002 | | |
| Magnets E | | | | 004 |

Here the sticking of contacts B2*b* would cause the setting of the B magnets in step 3 to represent 027 instead of 025 and result in the disagreement.

In like manner it may be demonstrated that failure of a C, D or E contact would result in ultimate disagreement in the D and E magnet sets. The important feature of the present arrangement lies in the fact that a check is made after each entry to insure that the contacts functioned correctly at all times, and it guards against the momentary failure of a contact for possibly just an entry or two. Thus, without a check as explained if a contact stuck for just one entry, the error would go undetected until all operations for a series of cards, which might be considerable in number, had elapsed and then the final total would be wrong and there would be no way of telling where and when the error occurred.

*Checking circuits.*—The E and D sets of magnets control contacts suffixed *b*, and if both sets are set alike the closure of contacts R16*h*, R16*t* and R16*u* in step 5 will cause illumination of lamps 56 in each order through a circuit, of which that in the units order is representative. For the example chosen, none of the E and D magnets are energized to indicate a 0 digit in both sets. Thus, when contacts R16*u* close, there is a series circuit traceable (Fig. 1*d*) from line 16, left hand contacts E8*b* to D1*b*, lamp 56 and relay magnet R19 to line 15. Magnet R19 in each order opens contacts R19*u*, R19*t* and R19*h* wired in parallel from line 16 to a magnet R17 (Fig. 1*d*). Since all orders check there will, of course, be no energization of magnet R17.

Upon unlike setting of the E and D magnets in any order, the circuit to magnet R19 will not be completed for that order and as a result the lamp 56 will not be illuminated. Therefore, when magnet R18 is energized (Fig. 3) to close its contacts R18*a*, there will be a circuit from line 16 (Fig. 1*d*, for example), now closed contacts R19*u*, magnet R17, contacts R18*a* to line 15 which will remain established at the end of the revolution of commutator 21.

Figure 2:
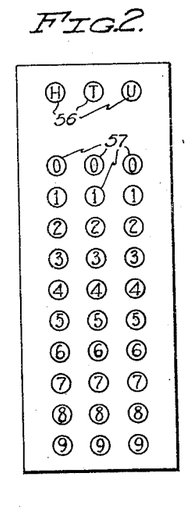
Fig. 2 is a view showing the arrangement of the total and error indicating lamp panel.

The lamps 56 may be arranged on an indicator panel (Fig. 2) for visual identification of the order in which the E and D magnets disagreed in their setting.

In Fig. 1*e*, magnet R17 opens its contacts R17*a* to thus prevent further operations, thereby apprising the operator that an error has occurred and enabling correction of the difficulty at once.

*Total indicator.*—If at any time while the apparatus is at rest, it is desired to know the total set on the B set of magnets, the operator will close total contacts T (Fig. 1*e*) to complete a circuit from line 15, contacts T, magnets R20 and R21 to line 16. Magnet R20 closes its contacts R20*u*, R20*t* and R20*h* at the bottom, right, of Figs. 1d, 1c, 1b respectively, and magnets R21 close sets of contacts R21u, R21t and R21h at the top of these figures.

As a result, for the units order by way of example a circuit is completed through the adding chain as already traced to the wire 36 corresponding to the units digit of the amount set on the B magnets (magnets A have no significant digit setting at this time). From wire 36 the circuit extends through a lamp 57 corresponding to the digit set on the B magnets to line 15.

There is accordingly disclosed a reliable calculating apparatus in which a check is made after each amount entry and, where error occurs, an indication is made localizing the source of such error and preventing further operation. It is especially valuable where errors, due to momentary relay failure, may occur and serves to assure that such failures have not occurred during a run of cards through the machine. Such failures might be due to a particle of dust momentarily preventing current conduction through a closed contact and not necessarily due to any mechanical failure of the mechanism.

It will be understood that the invention is not restricted to the particular form of adding chain shown or the particular code employed in representing the digits on the several magnet sets.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a computing apparatus, a series of five entry receiving devices, a source of data representative of an amount to be added, means controlled by said source for causing entry of said amount into the first entry receiving device, means jointly controlled by the first and second entry receiving devices for effecting an entry into the third device representative of the sum of the entries in said first and second devices, means operating concurrently therewith and controlled by the second device for transferring the entry in the second device to the fourth device, means for clearing the second device and reentering therein the sum in the third device and concurrently clearing the first device and reentering therein the initial amount from the source in the form of a complement, means jointly controlled by the first and second devices for effecting an entry into the fifth device of the sum of the entries in the first and second devices, means for comparing the entries in the fourth and fifth devices, means controlled by said comparing means for indicating the relationship of the amounts in the said fourth and fifth devices, and mechanism for initiating and effecting the operation of the several said means in the order named.

2. In a computing apparatus, a plurality of entry receiving devices, a source of data representative of an amount to be added, means controlled by said source for causing entry of said amount into a first one of said entry receiving devices, means jointly controlled by said first and by a second entry receiving device for effecting an entry into a third entry receiving device representative of the sum of the entries in said first and second devices, a comparing mechanism arranged to receive two amounts and effect comparison thereof, means operating concurrently with the entry of said sum into the third device and controlled by the second device for transferring the entry in the second device to said comparing mechanism, means for clearing the second device and reentering therein the sum in the third device, and concurrently clearing the first device and reentering therein the initial amount from the source in the form of a complement, means jointly controlled by the first and second devices for effecting an entry into the comparing mechanism of the sum of the entries in the first and second devices, means controlled by the comparing mechanism for indicating the relationship of the amounts entered therein and mechanism for initiating and effecting the operation of the several said means in the order named.

3. In a computing apparatus, a relay adding chain settable to represent two amounts therein, an entry receiving device initially set to represent an amount and initially causing said amount to be set on the relay adding chain, a source of data representative of an amount to be added to said initially set amount, means controlled by said source for causing setting of the second amount on said adding chain, a second entry receiving device, means controlled by the adding chain for entering the sum of the two amounts therein into said second device, a comparing mechanism arranged to receive two amounts and effect comparison thereof, means operating concurrently with the entry of said sum into the second device and controlled by the first device for transferring the initial entry in the first device to said comparing mechanism, means for clearing the adding chain and reentering therein the sum in the second device and concurrently reentering therein the amount from the source in the form of a complement, means controlled by the adding chain for entering the sum of such last two entries into the comparing mechanism, means controlled by the comparing mechanism for indicating the relationship of the two sums entered therein, and mechanism for initiating and effecting the operation of the several said means in the order named.

4. In a computing apparatus, a relay adding chain settable to represent two amounts therein, an entry receiving device initially set to represent an amount and initially causing said amount to be set on the relay adding chain, a source of data representative of an amount to be added to said initially set amount, means controlled by said source for causing setting of the second amount on said adding chain, a second entry receiving device, means effective after said entry of the second amount for causing the adding chain to enter the sum of the two amounts therein into said second device, a comparing mechanism arranged to receive two amounts and effect comparison thereof, means also effective after said entry of the second amount for causing said first device to enter the initial entry therein into said comparing mechanism, means for thereafter clearing the adding chain and reentering therein the sum in the second device and also entering therein the amount from the source in the form of a complement, means thereafter effective for causing the adding chain to enter the sum of such last two entries into the comparing mechanism, and means controlled by the comparing mechanism for indicating the relationship between the two sums entered therein.

5. In a computing apparatus, means for emitting electrical impulses at five successive periods in the operation of the apparatus, a series of five entry receiving devices responsive to electrical impulses, a source of data representative of an amount to be added, means controlled by said source in response to impulses at the first period for causing entry of said amount into the first entry receiving device, means jointly controlled by the first and second entry receiving devices in response to impulses at the second period for effecting an entry into the third device representative of the sum of the entries in said first and second devices, further means controlled by the second device in response to impulses at the second period for transferring the entry in the second device to the fourth device, means for clearing the first and second devices between the second and third periods, means controlled by said source in response to impulses at the third period for causing entry of the initial amount from the source into the first device in the form of a complement, further means controlled by the third device in response to impulses at the third period for entering the sum in the third device into the second device, means jointly controlled by the first and second devices in response to impulses at the fourth period for effecting an entry into the fifth device of the sum of the entries in the first and second devices, and means jointly controlled by the fourth and fifth devices in response to impulses in the fifth period for comparing the amounts therein and indicating the relationship.

WILLIAM LANG.

REFERENCES CITED

The following references are of record in the file of this patent:

UNITED STATES PATENTS

| Number | Name | Date |
|---|---|---|
| 2,150,208 | Daly et al. | Mar. 14, 1939 |
| 2,344,885 | Kozma et al. | Mar. 21, 1944 |
| 2,340,741 | Ghertman | Feb. 1, 1944 |
| 2,359,616 | Bryce | Oct. 3, 1944 |
| 2,388,354 | Wheeler | Nov. 6, 1945 |